United States Patent [19]

Abe

[11] Patent Number: 5,043,746

[45] Date of Patent: Aug. 27, 1991

[54] LIQUID JET PIPE HOLDING ELEMENT

[75] Inventor: Tsutomu Abe, Isehara, Japan

[73] Assignee: Canon Kabushiki Kaisha, Tokyo, Japan

[21] Appl. No.: 579,098

[22] Filed: Sep. 7, 1990

Related U.S. Application Data

[63] Continuation of Ser. No. 298,195, Jan. 17, 1989, abandoned, which is a continuation of Ser. No. 70,667, Jul. 6, 1987, abandoned, which is a continuation of Ser. No. 727,438, Apr. 26, 1985, abandoned.

[30] Foreign Application Priority Data

May 4, 1984 [JP] Japan .................................. 59-88482

[51] Int. Cl.[5] .......................... G01D 15/16; B41J 2/17

[52] U.S. Cl. ................................ 346/140 R; 248/68.1

[58] Field of Search ................. 346/140, 75; 248/68.1, 248/74.2, 74.1

[56] References Cited

U.S. PATENT DOCUMENTS 3,373,435 3/1968 Strong ............................ 346/140 R
4,511,907 4/1985 Fukuchi ....................... 346/140 PD
4,542,386 9/1985 Delligatii ...................... 346/140 PD

FOREIGN PATENT DOCUMENTS 1005511 9/1965 United Kingdom ........... 174/117 F

*Primary Examiner*—Mark J. Reinhart
*Attorney, Agent, or Firm*—Fitzpatrick, Cella, Harper & Scinto

[57] ABSTRACT

In a liquid jet recorder having a liquid jet record head mounted on a reciprocally driven carriage, a plurality of tubes connected to the liquid jet record head are accommodated in holes formed in a flat flexible member.

10 Claims, 3 Drawing Sheets

LIQUID JET PIPE HOLDING ELEMENT

This application is a continuation of application Ser. No. 07/298,195 filed Jan. 17, 1989, which is a continuation of application Ser. No. 07/070,667, filed July 6, 1987, which is a continuation of application Ser. No. 06/727,438, filed Apr. 26, 1985, all now abandoned.

BACKGROUND OF THE INVENTION

1. Field of the Invention

The present invention relates to a liquid jet record head and a liquid jet recorder having such a liquid jet record head, and more particularly to a liquid jet record head having an ink supply or ink supply/suction flexible tube connected thereto and a liquid jet recorder having such a liquid jet recorder.

2. Description of the Prior Art

In a serial scan liquid jet recorder, a tube for supplying ink to an ink sub-tank on a reciprocating carriage is flexible so that it can follow the movement of the carriage, and it is flat having a plurality of subtubes so that a swing locus of the tube is constant during the movement of the carriage.

In the past, the tubes are flattened by silicone RTV (room temperature vulcanizing) which is silicone rubber compound cured at room temperature to form rubber elastic material. In this method, the tubes are arranged on an arrangement jig and then integrated by the silicone RTV. However, it is not easy to arrange the tubes on the arrangement jig and the tubes may be bonded while they are crossed. It takes a long time and work efficiency is low unless it is done by an experienced person.

Further, since the silicone RTV for bonding the tubes requires a long curing time, a large number of jigs are necessary and a large amount of time is required. Since the curing time of the silicone RTV varies with the environment, it is difficult to schedule subsequent steps.

SUMMARY OF THE INVENTION

It is an object of the present invention to provide a liquid jet record head and a liquid jet recorder having such a liquid jet record head, which has a short manufacturing time and requires minimum manufacturing facilities.

It is another object of the present invention to provide a liquid jet record head having a plurality of tubes connected there to and having a flexible member for accommodating the plurality of tubes.

It is other object of the present invention to provide a liquid jet recorder having a reciprocally driven carriage, a liquid jet record head mounted on the carriage, a plurality of tubes connected to the liquid jet record head and a flexible member for accommodating the plurality of tubes.

DETAILED DESCRIPTION OF THE PREFERRED EMBODIMENTS

Figure 1:
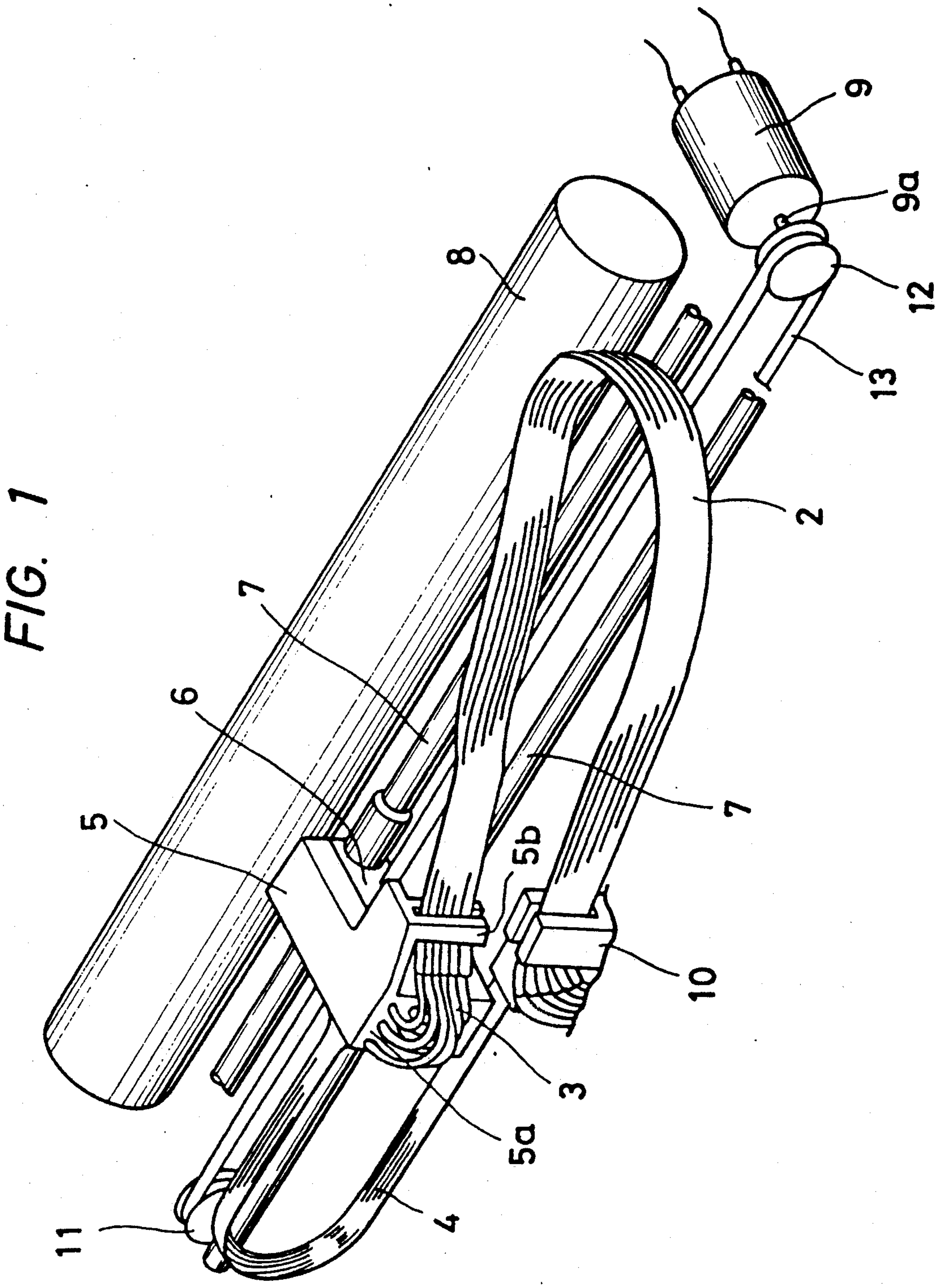
FIG. 1 is a perspective view of a main portion of a liquid jet recorder in accordance with the present invention.

FIG. 1 shows a construction of a main portion of the liquid jet recorder (ink jet printer) in accordance with the present invention.

Numeral 6 denotes a carriage which is slidably mounted on two guide bars 7. An ink sub-tank 5 is mounted on the carriage 6 to face a platen 8. A plurality of ink jet nozzles (not shown) are mounted in union with the ink sub-tank 5 on a side facing the platen 8.

The carriage 6 is fixed to an endless belt 13 spanned between pulleys 11 and 12. The pulley 12 is fixed to an output shaft 9*a* of a motor 9 so that the carriage 6 is reciprocally driven as the motor 9 is rotated.

Ends of a plurality of flexible tubes 3 for sucking and supplying ink are connected to a back side 5*a* of the ink sub-tank 5. The ends of the flexible tubes 3 connected to the ink sub-tank 5 are held in a flat belt shape by a support 5*b* which is integral with the ink sub-tank 5, and the other ends of the flexible tubes 3 are held in a flat belt shape by a support 10 mounted on a frame of the recorder. A flat cable 4 used to control the record operation is attached to a side of the ink sub-tank 5.

The portions of the flexible tubes 3 between the ink sub-tank 5 and the support 10 are held in a flat shape by a flexible member 2 of the present invention.

Figure 2:
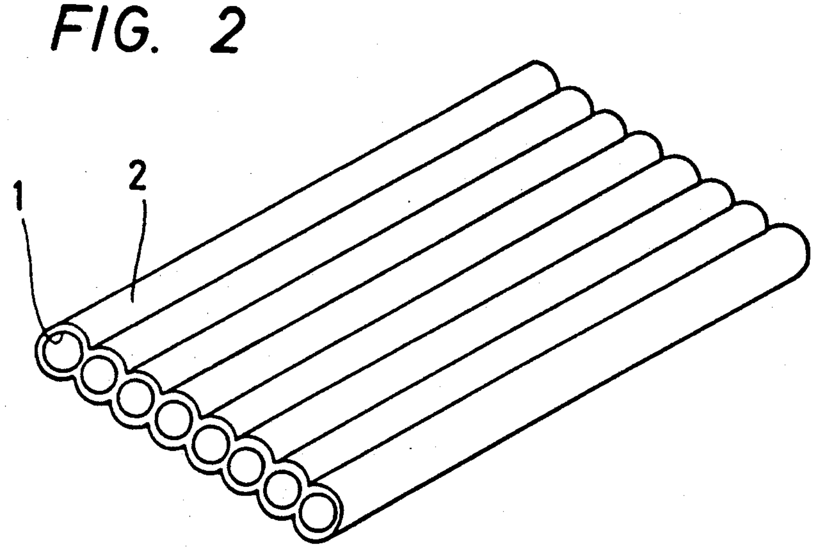
FIG. 2 is a perspective view of a flexible member of the present invention.

The flexible member 2 is constructed as shown in FIG. 2 which shows a perspective view of the flexible member 2. As shown therein, the flexible member 2 is of a shape of integrally formed multiple tubes, and the number of tubes is equal to the number of flexible tubes 3.

A diameter of the hole 1 of the tube of the flexible member 2 is large enough to allow easy insertion of the flexible tube 3 and deformation of the tube when the carriage moves.

Figure 3:
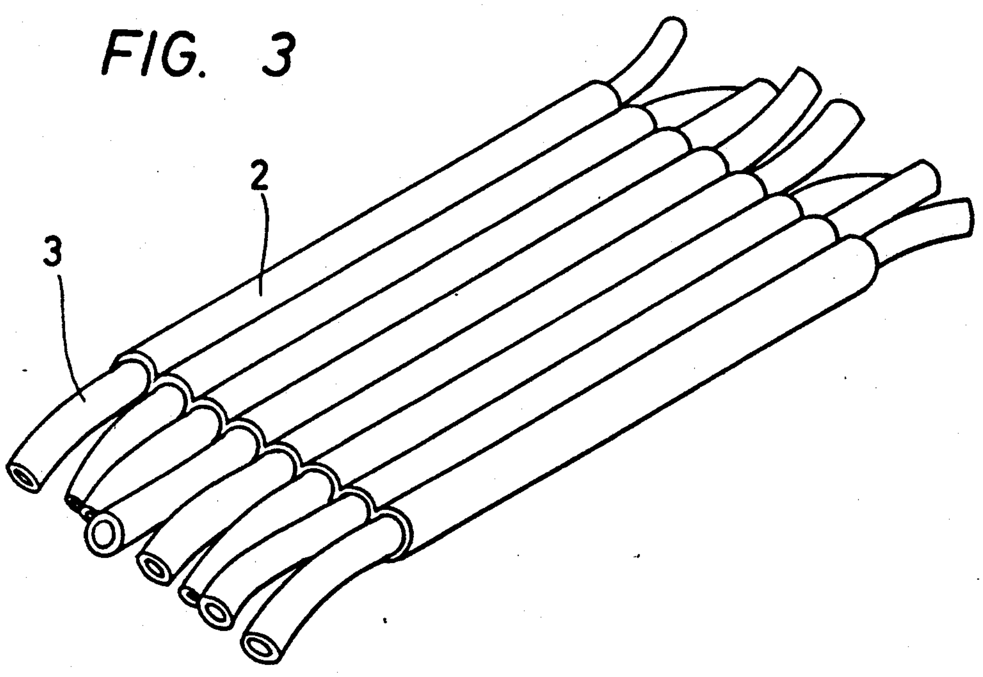
FIG. 3 is a perspective view illustrating mounting of flexible tubes to the flexible member.

When the flexible tubes 3 are to be connected to an ink main tank or other ink suction device and the ink sub-tank 5, the flexible tubes 3 are inserted into the holes 1 of the flexible member 2 as shown in FIG. 3 and the opposite ends of the flexible member 2 are fixed by the supports 5*b* and 10 shown in FIG. 1. The lengths of the flexible tubes and the flexible member 2 should be adjusted such that the carriage 5 can be moved without disturbance.

Figure 4:
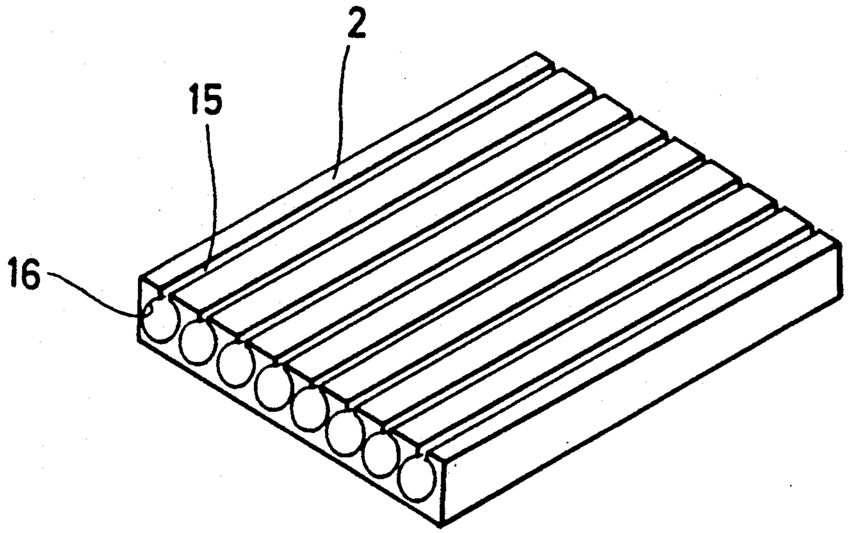
FIG. 4 is a perspective view of another embodiment of the flexible member.
Figure 5:
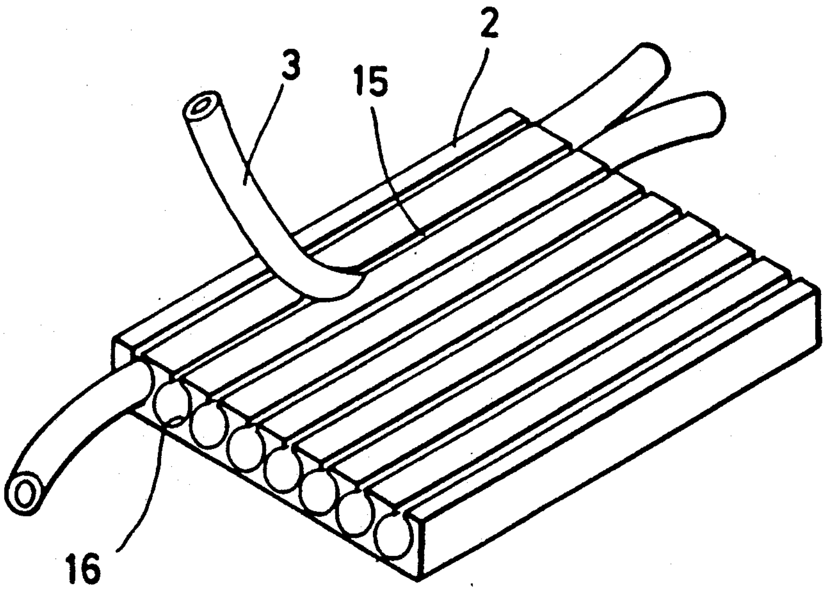
FIG. 5 is a perspective view illustrating mounting of flexible tubes 3 on the flexible member 2 shown in FIG. 4.

FIGS. 4 and 5 show another embodiment of the flexible member 2 of the present invention. As shown in FIG. 4, the flexible member 4 of the present invention is of a flat parallelepiped shape having a plurality of holes 16 for accommodating the flexible tubes 3 therein. The holes 16 have slits 15 at the tops so that the holes 16 have key-shaped cross sections.

The flexible tubes 3 are inserted into the flexible member 2 in a manner shown in FIG. 5. The flexible tube 3 is pushed into the hole 16 sequentially from the end of the flexible member 2 while the slit 15 at the top of the flexible member 2 is spread.

In the present embodiment, unlike the embodiment shown in FIGS. 2 and 3, the flexible tubes 3 need not be inserted into the holes of the flexible member 2 from one end thereof but the flexible tubes may be inserted from the spread slits 15. Accordingly, the insertion work is very easy to carry out.

In both embodiments, the flexible tubes 3 can be flattened and integrated very easily without special jig and the working time is reduced and misoperation in the work is prevented.

In the above embodiments, the flexible tubes 3 may be fixed to the flexible member 2 by adhesive material so that they are completely integrated.

As described hereinabove, according to the present invention, the flexible tubes for connecting the ink main tank or ink suction device to the ink sub-tank can be integrated in the flat shape in the very simple way by using the flexible member preformed to accommodate the flexible tubes therein. The workability is better than that in the prior art bonding method, the working time is reduced and not affected by the environment and the work can be carried out as scheduled. The work is very simple and the flat tubes can be manufactured without any special training. More uniform integration is attained by the present invention than by the prior art bonding method. Accordingly, the flexible tubes of the present invention can follow the movement of the carriage more precisely. Since no special jig is required, the work space can be reduced.

In the above description, the flexible tubes are connected to the record head mounted on the reciprocally driven carriage. The present invention is also effective when it is applied to a recorder in which the record head is not reciprocally driven, from the viewpoints of workability and maintenance. Because the tubes are bound, the tubes do not get entangled during the maintenance or assembling work, and the workability is improved.

What is claimed is:

1. An ink supplying member for an ink jet recording apparatus having a main body and a recording head mounted on said main body for movement relative thereto to effect recording by discharging ink to a recording medium, said ink supplying member comprising:

a plurality of elongated ink pipes for supplying ink to said recording head from said main body, wherein said elongated ink pipes are at least as long as the maximum distance between a support section on said movable recording head and a support section on said main body; and a single elongated holder of flexible material having a plurality of internal longitudinal passages therethrough for the entire length of said holder, wherein said ink pipes are disposed in said passages and said holder extends from the proximity of said recording head to said supporting section on said main body.

2. An ink jet recording apparatus comprising:

an ink jet recording head mounted on a main body of the apparatus for movement relative thereto to effect recording by discharging ink to a recording medium;

a plurality of elongated ink pipes for supplying ink to said recording head from said main body, wherein said elongated ink pipes are at least as long as the maximum distance between a support section on said movable recording head and a support section on said main body; and a single elongated holder of flexible material having a plurality of internal longitudinal passages therethrough for the entire length of said holder, wherein said ink pipes are disposed in said passages and said holder extends from the proximity of said recording head to said supporting section on said main body.

3. An apparatus according to claim 2, further comprising a carriage having said recording head mounted thereon.

4. A pipe member for an ink jet recording apparatus having a main body and a recording head mounted on said main body for movement relative thereto to effect recording by discharging ink to a recording medium, said pipe member comprising:

a plurality of elongated pipes, wherein said elongated pipes are at least as long as the maximum distance between a support section on said movable recording head and a support section on said main body; and a single elongated holder of flexible material having a plurality of internal longitudinal passages therethrough for the entire length of said holder, wherein said pipes are disposed in said passages and said holder extends from the proximity of said recording head to said supporting section on said main body.

5. A pipe member according to claim 4, wherein said flexible holder is flat and belt-like in configuration with said internal passages in side-by-side relation and each of said passages is slit along its length on one side of said holder.

6. An ink jet recording apparatus comprising:

an ink jet recording head mounted on a main body of the apparatus for movement relative thereto to effect recording by discharging ink to a recording medium;

a plurality of elongated pipes, wherein said elongated pipes are at least as long as the maximum distance between a support section on said movable recording head and a support section on said main body; and a single elongated holder of flexible material having a plurality of internal longitudinal passages therethrough for the entire length of said holder, wherein said pipes are disposed in said passages and said holder extends from the proximity of said recording head to said supporting section on said main body.

7. An apparatus according to claim 6, wherein said flexible holder is flat and belt-like in configuration with said internal passages in side-by-side relation and each of said passages is slit along its length on one side of said holder.

8. An apparatus according to claim 6, further comprising a carriage having said recording head mounted thereon.

9. An ink supplying member according to claim 1, wherein said flexible holder is flat and belt-like in configuration with said internal passages in side-by-side relation and each of said passages is slit along its length on one side of said holder.

10. An apparatus according to claim 2, wherein said flexible holder is flat and belt-like in configuration with said internal passages in side-by-side relation and each of said passages is slit along its length on one side of said holder.

* * * * *